(12) United States Patent
Khanzadian

(10) Patent No.: US 9,572,431 B2
(45) Date of Patent: Feb. 21, 2017

(54) SUPPORTIVE COMFORT CUSHION

(71) Applicant: Sarkis Khanzadian, Fresno, CA (US)

(72) Inventor: Sarkis Khanzadian, Fresno, CA (US)

(*) Notice: Subject to any disclaimer, the term of this patent is extended or adjusted under 35 U.S.C. 154(b) by 265 days.

(21) Appl. No.: 14/014,309

(22) Filed: Aug. 29, 2013

(65) Prior Publication Data
US 2014/0059775 A1  Mar. 6, 2014

Related U.S. Application Data

(60) Provisional application No. 61/694,266, filed on Aug. 29, 2012.

(51) Int. Cl.
| A47C 16/00 | (2006.01) |
| A47C 7/02 | (2006.01) |
| B29D 99/00 | (2010.01) |
| B29C 33/40 | (2006.01) |
| B29C 39/00 | (2006.01) |
| B29C 39/26 | (2006.01) |
| A47C 27/06 | (2006.01) |
| A47C 23/00 | (2006.01) |
| A47C 27/20 | (2006.01) |
| B29L 31/00 | (2006.01) |

(52) U.S. Cl.
CPC ............ *A47C 7/021* (2013.01); *A47C 27/065* (2013.01); *B29C 33/40* (2013.01); *B29C 39/003* (2013.01); *B29C 39/26* (2013.01); *B29D 99/0092* (2013.01); *A47C 23/002* (2013.01); *A47C 27/06* (2013.01); *A47C 27/20* (2013.01); *B29L 2031/721* (2013.01); *B29L 2031/751* (2013.01)

(58) Field of Classification Search
CPC ....... A47C 23/002; A47C 27/20; A47C 27/06; A47C 27/065; A47C 27/07; A47C 7/021; B29C 39/003; B29C 39/26; B29C 33/40; B29L 2031/721; B29L 2031/751; B29D 99/0092
See application file for complete search history.

(56) References Cited

U.S. PATENT DOCUMENTS

| 2,979,739 | A | * | 4/1961 | Krakauer | A47C 27/04 267/142 |
| 3,210,781 | A | * | 10/1965 | Pollock | A47C 27/001 267/91 |
| 3,257,149 | A | * | 6/1966 | Fruchte | A47C 7/022 264/45.1 |
| 3,633,228 | A | * | 1/1972 | Zysman | A47C 7/20 267/143 |
| 4,154,786 | A | * | 5/1979 | Plasse | A47C 27/20 249/64 |

(Continued)

*Primary Examiner* — David E Sosnowski
*Assistant Examiner* — Morgan McClure
(74) *Attorney, Agent, or Firm* — Sherrie Flynn; Coleman & Horowitt, LLP

(57) ABSTRACT

A support comfort cushion is disclosed comprising a plurality of gel springs absorbs, a plurality of interlocking support members, and a base cushion, all of which serve to redistribute directional force as applied, proportionate to the weight and anatomy of an animal or human, i.e. those areas of anatomy most susceptible to pressure points, e.g. elbows, paws, neck, shoulders, back, hip joints. The gel springs contain bellows and adjacent gel spring junctions which act together providing transitional resistive slippage to dynamic influence of weight and movement, all the while providing counter-pressure, suspension.

7 Claims, 12 Drawing Sheets

(56) References Cited

U.S. PATENT DOCUMENTS

| | | | | |
|---|---|---|---|---|
| 4,930,171 | A * | 6/1990 | Frantz | A47C 7/021 297/DIG. 1 |
| 5,515,811 | A | 5/1996 | McAlister | |
| 5,685,257 | A | 11/1997 | Feibus | |
| 5,756,184 | A | 5/1998 | Yates | |
| 6,101,651 | A * | 8/2000 | Tang | A47C 27/065 5/252 |
| 6,286,167 | B1 * | 9/2001 | Stolpmann | A47C 27/001 5/710 |
| 6,413,458 | B1 * | 7/2002 | Pearce | A43B 13/04 264/141 |
| 7,185,604 | B2 | 3/2007 | Holte | |
| 8,434,748 | B1 * | 5/2013 | Pearce | A47C 27/20 267/142 |
| 2002/0162173 | A1 * | 11/2002 | Formenti | A47C 27/148 5/718 |
| 2003/0037377 | A1 * | 2/2003 | Kawamura | A47C 21/046 5/652 |
| 2004/0172766 | A1 * | 9/2004 | Formenti | A47C 27/148 5/718 |
| 2005/0116526 | A1 * | 6/2005 | VanDeRiet | A47C 7/022 297/452.51 |
| 2005/0193497 | A1 * | 9/2005 | Baker | A47C 27/001 5/721 |
| 2007/0246157 | A1 * | 10/2007 | Mason | A47C 27/085 156/242 |
| 2008/0201856 | A1 * | 8/2008 | Howard | A47C 27/001 5/690 |
| 2009/0025150 | A1 * | 1/2009 | Smalling | A47C 23/005 5/718 |
| 2010/0223730 | A1 * | 9/2010 | Pearce | A47C 27/148 5/655.5 |
| 2010/0227091 | A1 * | 9/2010 | Pearce | A47C 27/056 428/36.1 |
| 2010/0237082 | A1 * | 9/2010 | Fernandez | A47C 7/021 220/592.17 |
| 2011/0173757 | A1 * | 7/2011 | Rensink | A47C 27/04 5/698 |
| 2012/0015151 | A1 * | 1/2012 | Pearce | A47C 27/085 428/156 |
| 2013/0146211 | A1 * | 6/2013 | Mason | B32B 5/18 156/93 |
| 2013/0167302 | A1 * | 7/2013 | Pearce | A47C 27/144 5/739 |
| 2013/0269113 | A1 * | 10/2013 | Wood | A47C 27/14 5/691 |

* cited by examiner

SUPPORTIVE COMFORT CUSHION

CROSS-REFERENCE TO RELATED APPLICATIONS

The present application claims the benefit of U.S. Provisional Application No. 61/694,266, filed Aug. 29, 2012, by Sarkis Khanzadian and titled "Supportive Pet Cushion", incorporated by reference herein and for which benefit of the priority date is hereby claimed.

FEDERALLY SPONSORED RESEARCH

Not applicable.

SEQUENCE LISTING OR PROGRAM

Not applicable.

FIELD OF INVENTION

The present invention relates to cushions and support devices, and more particularly to comfort cushions for pets, other animals, and humans, that can be placed directly on a surface and provide protection and relief from pressure points and the pain associated to body parts coming in contact with hard surfaces over prolonged periods, such as during rest, recuperation, or sleep.

BACKGROUND OF THE INVENTION

Animals and humans experience pain to the elbows and hips when subjected for long periods of contact, by laying down on or otherwise, with hard surfaces. Animals in particular are subjected to a lifetime of laying on hard surfaces e.g. concrete, wood flooring, mats, and padded bedding. As a result, and as they grow older, they experience a variety of ailments leading to discomfort, calluses, pain, and even arthritis from the cold and hard surfaces they must lay on. Humans develop bed sores from prolonged exposure to hard/firm surfaces.

An invention is needed that specifically addresses the problem of pressure points for humans and animals, and especially addressing pets in their sleeping environment.

With respect to pet bedding various foams, materials, compositions and the like offer cushion and support, yet have different means of supporting the weight being applied, either by more layers of foam and padding, or by some spun, spring like material. These items are mass produced, and generally lack sufficient body weight supporting composition. Whether foams, or other materials in combination, they tend to deflect under the pressure of weight, becoming compressed, thus yielding entirely, and therefore tending towards hardness, or at best semi-hardness.

Foams tend to encapsulate the weight applied, allowing the weight to sink inward, thus requiring extra thickness sufficient to uphold the weight. Foams tend to retain heat quickly, and continue to heat up, making them uncomfortable to some. Thick compositions of foams are costly.

Even pet bedding of various forms and embodiments do not provide effective comfort, as they are generally made from polyurethane open cell foam, a petroleum based product that out-gasses overtime, or layers of various combinations of materials, all of which are generic in nature, and typically flat with little or no support, or warmth, amounting to no more than a semi-hard mat, or padding.

U.S. Pat. No. 5,724,911 granted to McAlister for Cushion for a Household Pet features layers of raw, unwoven, uncovered polyester. However, this cushion suffers from compression when weight is applied and it does not provide uniform distribution of weight under pressure.

U.S. Pat. No. 5,685,257 granted to Feibus for Pet Support Cushion features layers of discrete material. However, this cushion also suffers from compression when weight is applied and it does not provide uniform distribution of weight under pressure.

U.S. Pat. No. 7,185,604 granted to Holte for Orthopedic Pet Cushion addresses orthopedic benefits by utilizing slow recovery visco-elastic foam. However, foam does not distribute weight vertically, it collapses under pressure, and will not recover until the weight is removed. When weight is applied, foam is compressed and becomes compacted by some measured thickness into a film with nearly zero counterforce, save the little resilience inherent to specific types of foam. Also, foams have a tendency to overheat and absorb more than can be dissipated. Additionally, foams outgas and deteriorate over time.

U.S. Pat. No. 5,756,184 granted to Yates for Gel Cushion discloses thermoplastic gel with voids. However, unlike the close configuration of gel springs, with bellows and bellows junctions (in between gel springs) which provide efficient body suspension system, gels with large void configurations collapse/fold over when weight is applied, resulting in the void spaces being filled into by the thin membrane walls, which translates into a flat, thin cushion with irregular surface contour. Gel springs provide counter pressure/spring back, as well as yielding to the weight applied. Additionally the interlocking configuration between the gel springs and the junctions act as a friction against collapse, reinforcing the suspension like support.

U.S. Pat. No. 8,434,748 to Pearce for Cushions Comprising Gel Springs discloses cylindrical gel structures. However, cylindrical gel springs without bellows would not provide the same friction with said forces being applied and would most easily fold over flat, not retaining the vertically parallel positions of the cylinders when weight is not present.

SUMMARY OF THE INVENTION

In accordance with the present invention, there is provided an apparatus that enables protection and relief from pressure points and the pain associated to body parts coming in contact with hard surfaces over prolonged periods, such as during rest, recuperation, or sleep. The apparatus is a cushion that may be formed from platinum silicone or other elastomeric polymers. The cushion may be infused with specially designed devices, and or vessels, capsules, sensors, particles, chemicals, liquids, of dual polarities by composition, and capacitance, in suspension, and the like, each connectively/electromagnetically associated to a central processing system, in turn interacting/controlling each and all associations/peripherals for purposes of bed, sleep, rest environmental control, i.e. heating, cooling, movement/vibration, sound, pest control electronic, or chemical.

In accordance with one embodiment of the present invention, a cushion comprising a plurality of gel springs absorbs and redistributes directional force as applied, proportionate to the weight and anatomy of an animal or human, i.e. those areas of anatomy most susceptible to pressure points, e.g. elbows, paws, neck, shoulders, back, hip joints. The gel springs contain bellows and adjacent gel spring junctions which act together providing transitional resistive slippage to dynamic influence of weight and movement, all the while providing counter-pressure, suspension.

The invention provides exceptional comfort by equally distributing the pressure on particular body parts, such as, elbow and hip joints. The invention suspends the weight with supportive counter-pressure, cradling and conforming to each body part with appropriate counterforce, to the force being applied, whether static, or in motion.

The invention is a free standing solution to many applications where the floor, or ground is the only option. The invention provides near perfect conformity to external impressions, and suspends body parts away from hard contact.

Individual springs join in concert to uniformly distribute vertically and diagonally the weight according to anatomy, weight, and direction of forces being applied, this in conjunction with the spaces in between the gel springs. Gel springs conform individually to body parts and shape. Additionally, gel springs have inherent counterforce by the very nature of the materials durometer, whereas foams are referred to in terms of density. Gel springs, even when entirely compressed, maintain a resilience equal to when not compressed. Gel springs act as 'springs' as their name indicates, and the anatomy is suspended according to shape, weight, and movements in play.

With respect to pressure points to the body that may cause discomfort, and bed sores, the focus is on support points; the more the better. With a common foam mattress, the point of greatest pressure is where the foam has yielded to its maximum compression in response to weight, thus pressure on body parts is greatest at those areas.

The bellows and adjacent gel spring junctions act together providing transitional resistive slippage to dynamic influence of weight and movement, all the while providing counter-pressure, suspension. Cylindrical gel springs without bellows would not provide the same friction with said forces being applied and would most easily fold over flat, not retaining the vertically parallel positions of the cylinders when weight is not present.

The arrangement of such bellows in cast form, provides a superior method of support, in contrast to cellular foams. The multiplicity of gel springs provide an elasto-monolithic structure, that minimizes direct pressure to anatomy surfaces and beneath, thereby greatly reducing pressure, to pressure point areas, since the gel material yields rather softly against the flesh, in contract to sheets, foam, or other bedding materials.

As an example of an elasto-monolithic structure, a trampoline is flexible, yet transmits its greatest counterforce, at the center of the weight/force being initially applied; although flexible it is not comfortable, and adds pressure to pressure point areas of the body.

BRIEF DESCRIPTION OF THE DRAWINGS

A complete understanding of the present invention may be obtained by reference to the accompanying drawings, when considered in conjunction with the subsequent, detailed description, in which.

DETAILED DESCRIPTION

Figure 1:
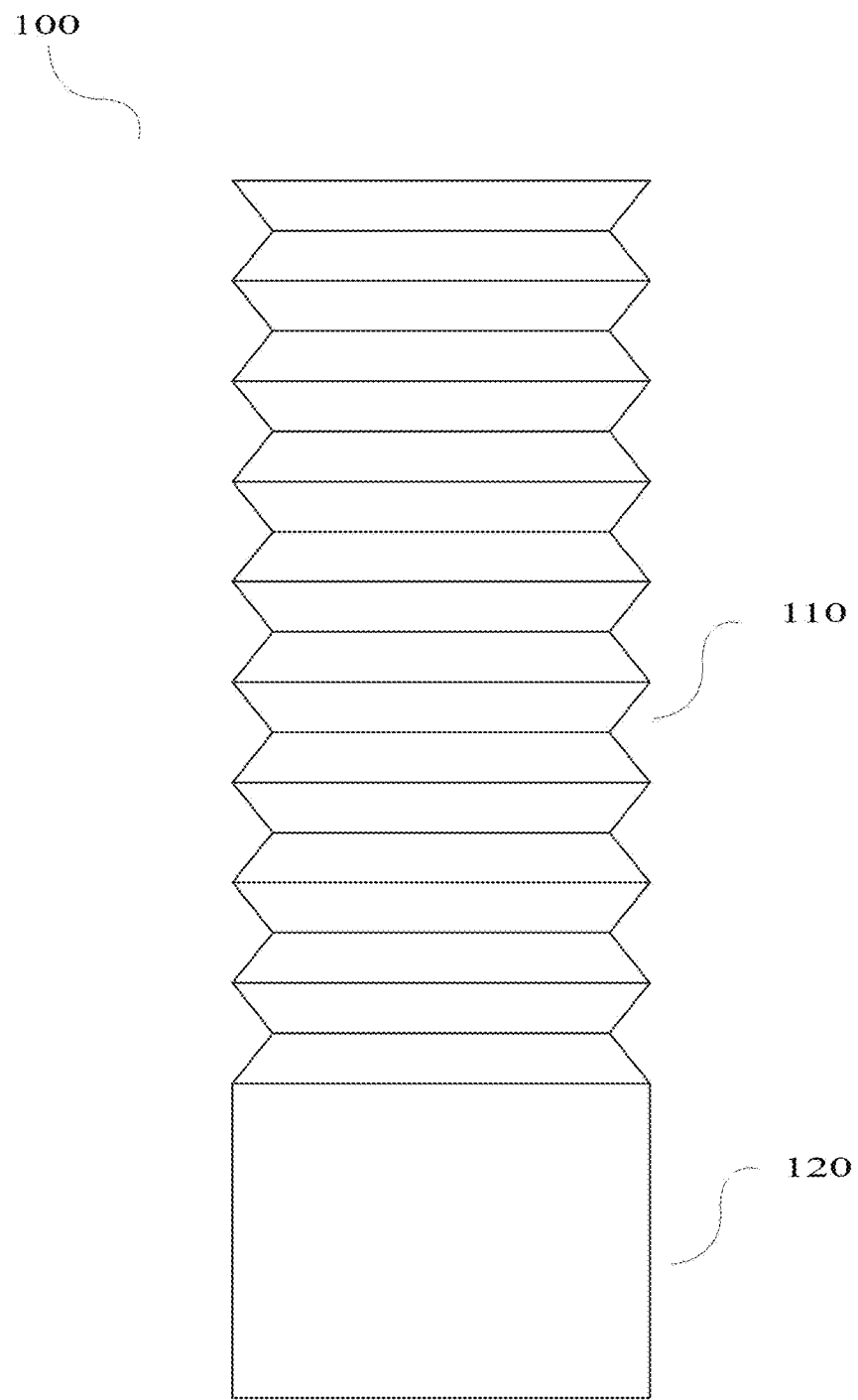
FIG. 1 is a side view of a gel spring mold.

Before the invention is described in further detail, it is to be understood that the invention is not limited to the particular embodiments described, as such may, of course, vary. It is also to be understood that the terminology used herein is for the purpose of describing particular embodiments only, and not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed with the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It must be noted that as used herein and in the appended claims, the singular forms "a", "an", and "the" include plural referents unless the context clearly dictates otherwise.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, if dates of publication are provided, they may be different from the actual publication dates and may need to be confirmed independently.

In one embodiment of the present invention, a small size cushion contains over two thousand gel springs composed of platinum silicone gel. In this embodiment, each gel spring conforms to the particular to body part, shape, weight, and direction of force being applied. The cushion conforms to a pet's or human's body weight and shape with supportive counter-force, conforming with appropriate counter-pressure.

In one embodiment of the present invention, the outer covers are made from plush synthetic polyester fleece or natural shearling.

In one embodiment of the present invention, several varieties of foam, e.g. closed-cell polyethylene, and cross-linked foam, are used to provide support for the pet or human in areas in which weight or force are not directly applied. These foams are used as a secondary support system in areas the animal or human may lean to, or against.

Turning now to FIG. 1, shown is a side view of a spring mold 100 comprising a spring mold base 110 and spring mold bellows 120.

Figure 2:
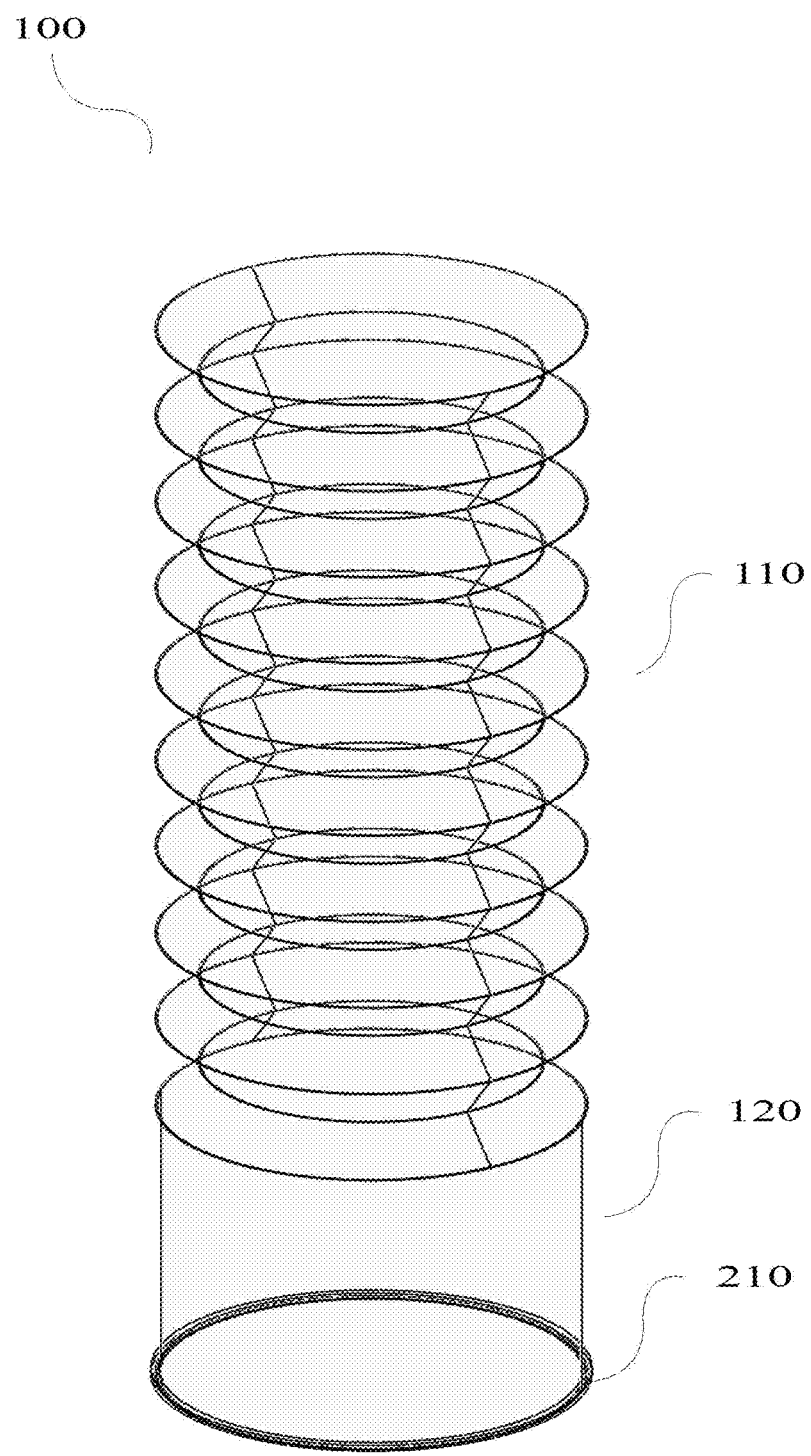
FIG. 2 is a wireframe isometric view of a gel spring mold.

Turning now to FIG. 2, shown is an isometric wireframe view of a spring mold 100 in which it can be seen that the spring mold 100 is a shaped hollow tube. In one embodiment of the present invention, the spring mold 100 is a polypropylene straw. The spring mold base rim 210 may be adhesively attached to a surface prior to application of the gel spring material into the spring mold 100.

Figure 3:
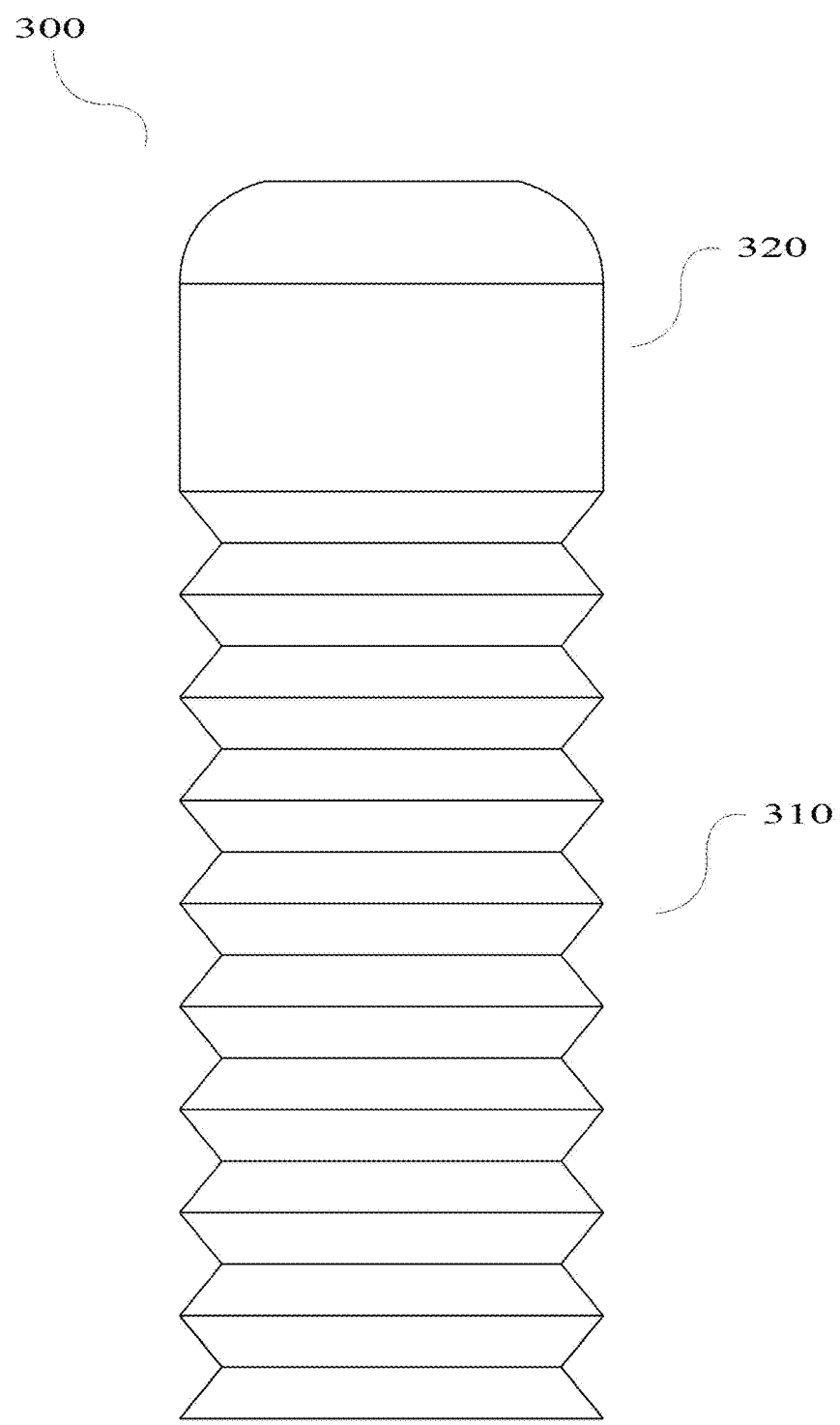
FIG. 3 is a side view of a gel spring.
Figure 4:
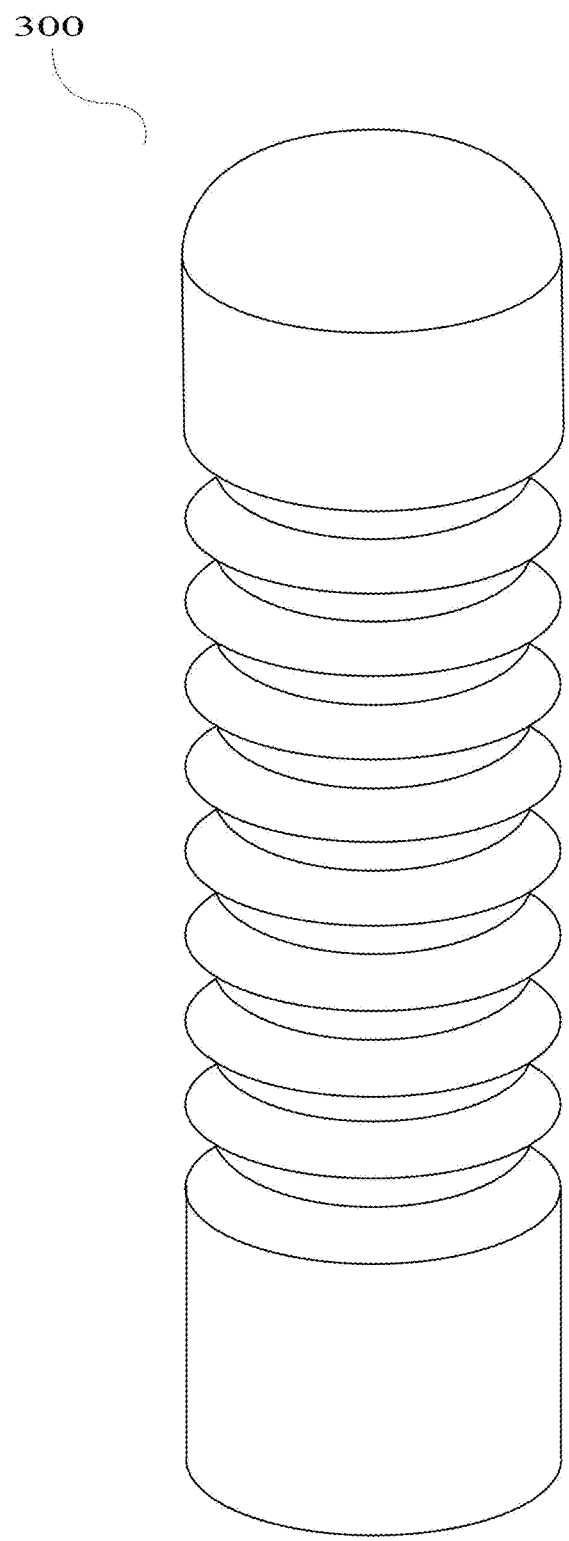
FIG. 4 is an isometric view of a gel spring.

Turning now to FIG. 3, shown is a side view of a gel spring 300, comprising a spring body 310 and a gel spring cap 320. FIG. 4 shows is an isometric view of the gel spring 300.

Figure 5:
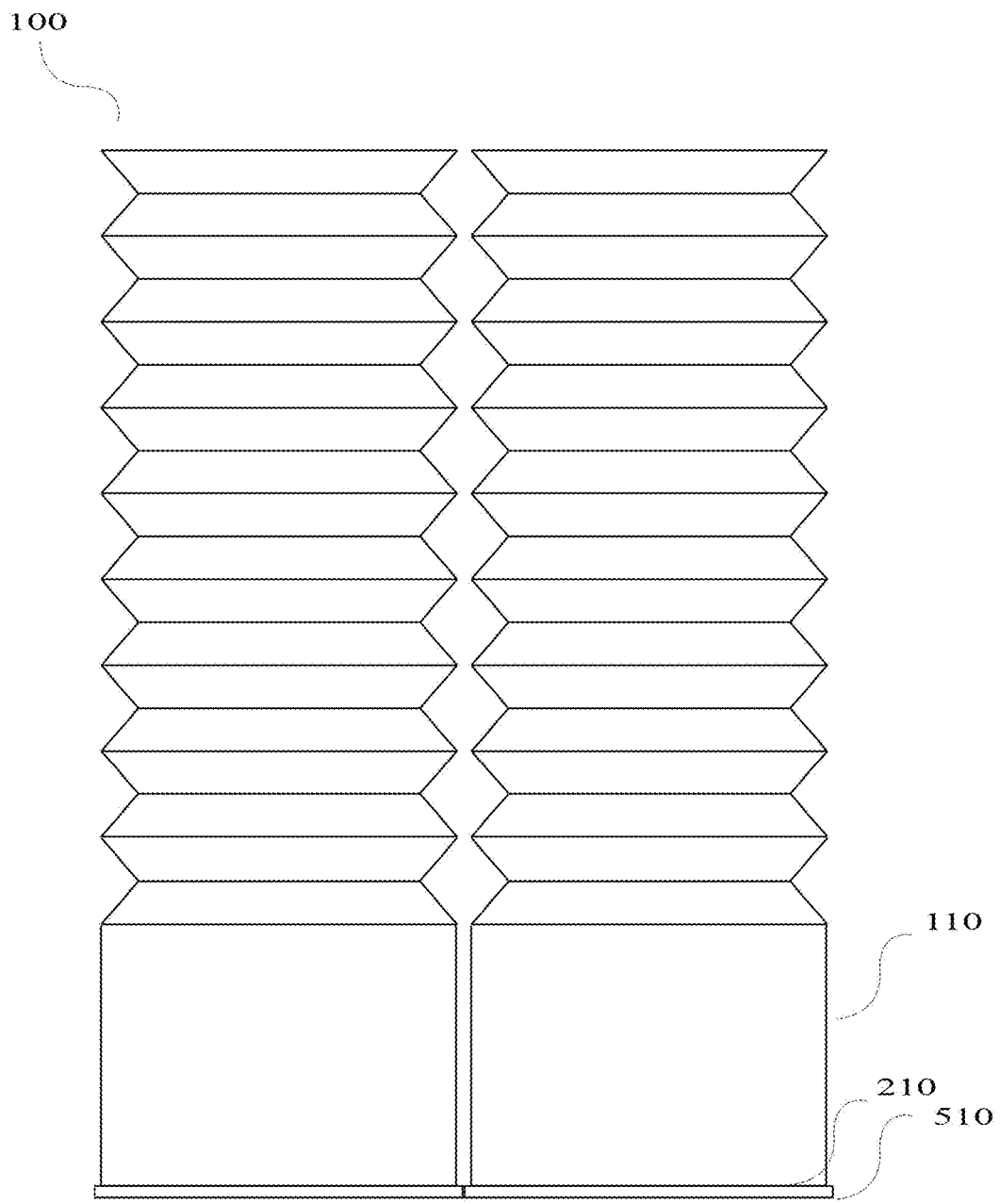
FIG. 5 is a side view of a partial gel spring cushion mold.

Turning now to FIG. 5, shown is a plurality of spring molds 100 melded together with the spring mold bases 110 attached at the spring mold base rims 210 to a cushion mold substrate 510. In one embodiment of the present invention, grouped spring molds 100 comprising straws are secured to the bottom of a mold tray with an adhesive epoxy. The adhesive epoxy forms a concave surface within the inner wall of the straws, to which the subsequently added silicone gel, forms a convex head silicone gel spring.

Figure 6:
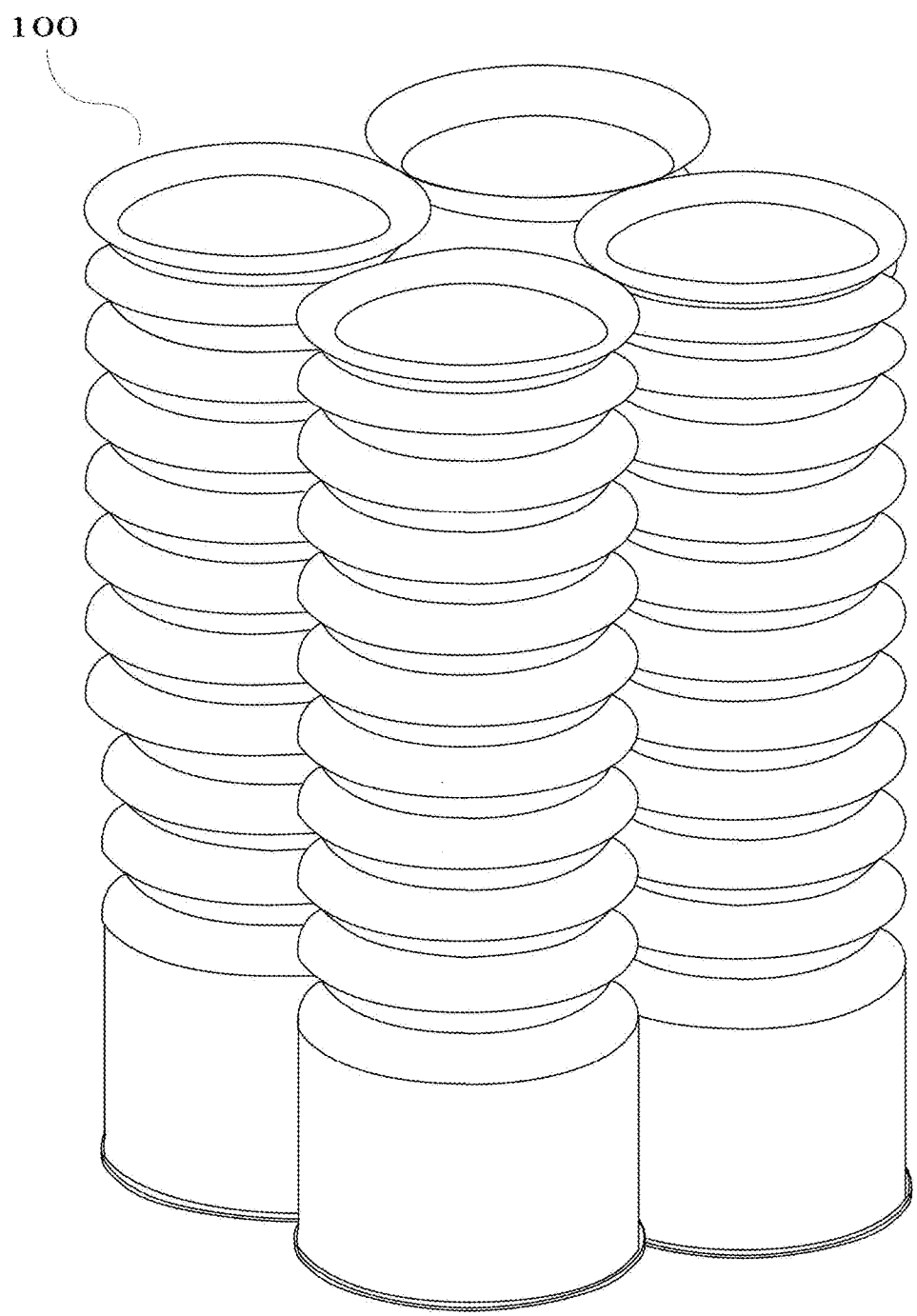
FIG. 6 is an isometric view of a partial gel spring cushion mold.

FIG. 6 shows an isometric view of the plurality of spring molds 100 melded together in a square tile circle packing arrangement. In one embodiment of the present invention, thousands of grouped spring molds 100 are melded by heat being applied to highlighted edges. In one embodiment of the present invention, parallel adjacent polypropylene straws form a bond from the melding process. The grouped spring molds 100 are attached to the cushion mold substrate comprising epoxy to the bottom of a tray which is part of the cushion mold. The arrangement of the spring molds 100 can be of various shapes, e.g., round, oval, rectangular, square, or other combinations. Similarly, the shape of the cushion mold can be of various shapes.

Figure 7:
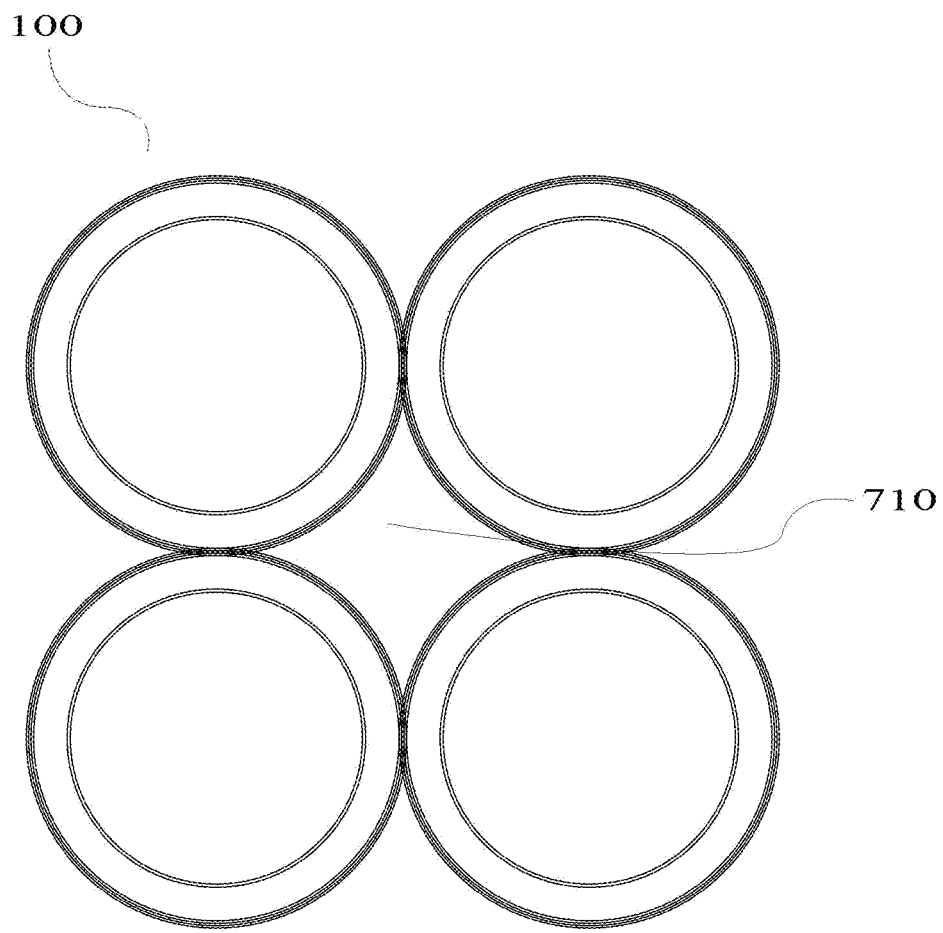
FIG. 7 is top view of a partial gel spring cushion mold.

Turning now to FIG. 7, shown is a top view of the plurality of spring molds 100 melded together in a square tile circle packing arrangement. The top view shows the interlocking support structure space 710 that exists in the space between the packed plurality of spring molds 100.

Figure 8:
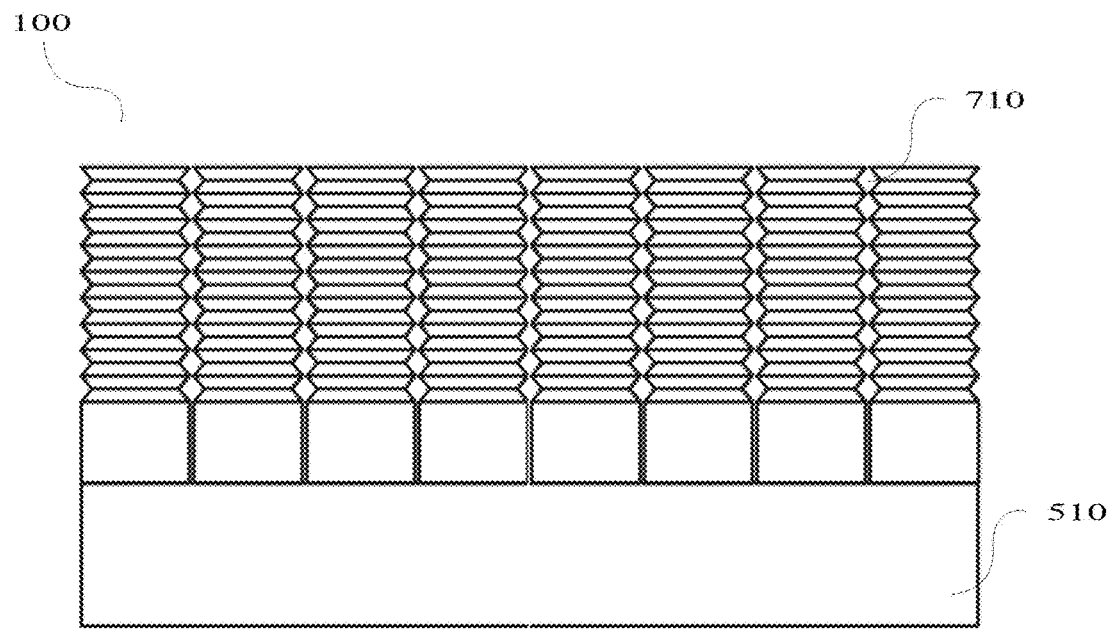
FIG. 8 is a side view of a partial gel spring cushion mold.

Turning now to FIG. 8, shown is a side view of the plurality of spring molds 100 melded together in a square tile circle packing arrangement to the cushion mold substrate 510. The cushion mold substrate 710 may be composed acrylic or similar mater capable of holding the spring molds 100 in place during the application of the gel spring material. In one embodiment of the present invention, the spring molds 100 comprising straws are melded together. As an example, a plurality of straws are first each stretched so as to extend the flexible portion of the straw to its fullest length; the plurality of straws are then stacked and banded together in either square or round configuration; the plurality of straws are then placed on a flat hot plate, whereby the heat melds the polypropylene ends flat and to adjacent straws. The straws are then cut at both points of the flexible portions of the straw. Once cut, the ends are again melded, so that both sides of the plurality of straws are melded. The result is a plurality of bellows all attached and with a flat flange on one end of each of them.

Figure 9:
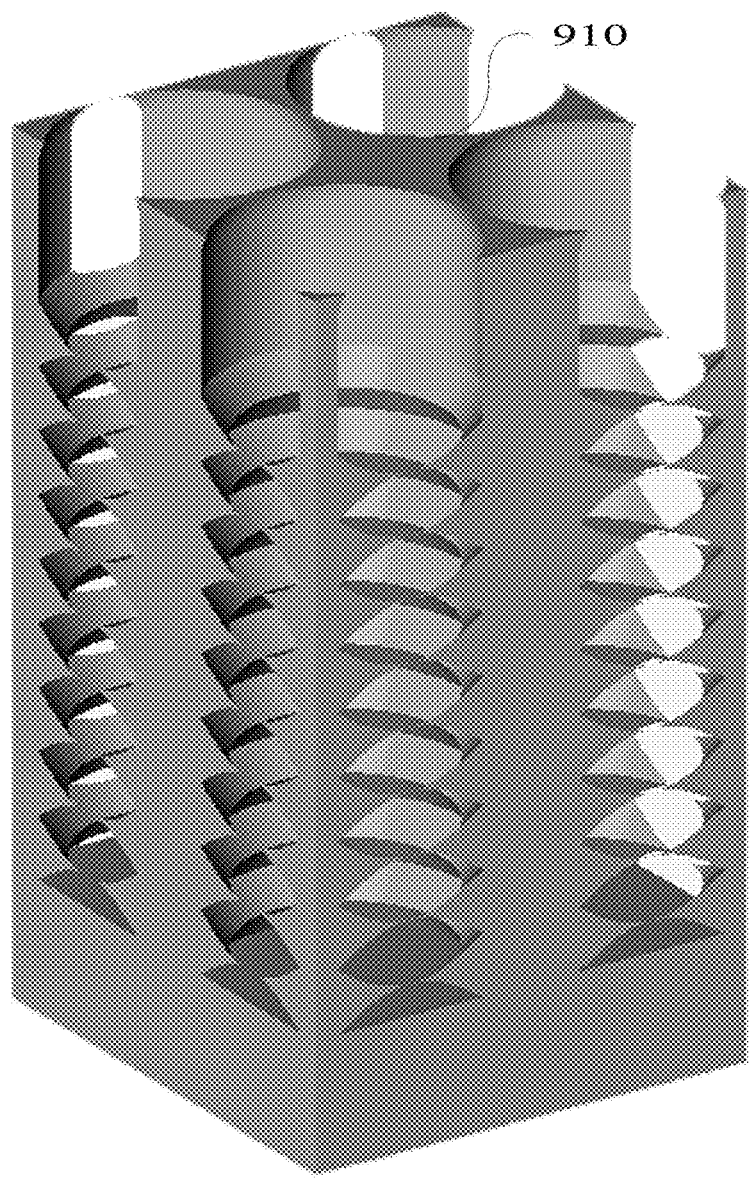
FIG. 9 is an isometric view of an interlocking support structure member.

Turning now of FIG. 9, shown is an interlocking support structure member 910 which is a result of gel spring material being applied to the interlocking support structure space 710.

Figure 10:
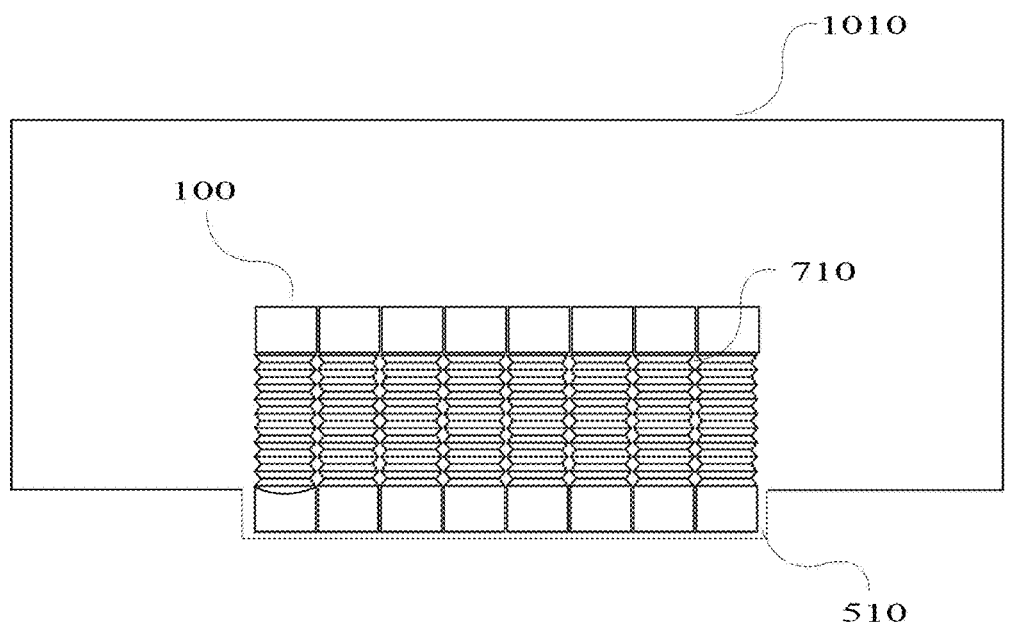
FIG. 10 is a side view of a gel spring cushion mold.

Turning now to FIG. 10, shown is a cushion mold 1010 in which a plurality of spring molds 100 are attached to the cushion mold substrate 510. When gel spring material is introduced into the cushion mold 1010, the gel spring material fills the space in the spring molds 100 to form gel springs, the gel spring material fills the interlocking support structure space 710 to form interlocking support structure members, and the remaining gel spring material surrounding and above the plurality of spring molds forms is an overlaying cohesive layer that forms the base cushion. The gel spring material can be composed of silicone gel or other elastomeric polymers. When the gel spring material is solidified, it is removed from the cushion mold 1010, resulting in a solid based supportive comfort cushion with thousands of gel springs 300 perpendicular to the horizontal plane. In one embodiment of the present invention, the resulting gel springs have a convex top resulting from the spring mold base that inserts into the mold, and the acrylic forms on the inside of the spring mold in a convex fashion. The spring gel is poured into the cushion mold, and the resulting gel spring has a convex tip, and the portion where the bellows terminate, are now cylindrically extended by some length, before becoming joined to the solid base cushion. Each gel spring has a convex surface that further reduces areas/points of contact; acting as well in a massaging fashion, with each movement of the body/parts.

Figure 11:
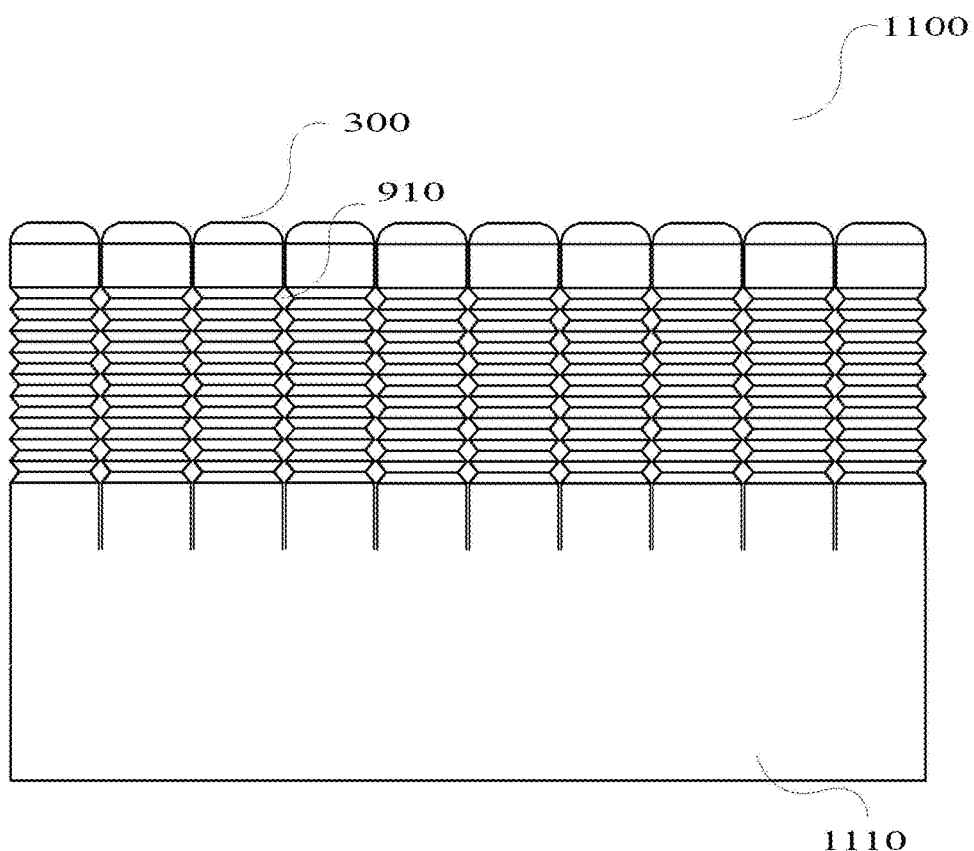
FIG. 11 is a side view of a gel spring cushion.

Turning now to FIG. 11, shown is a side view of a supportive comfort cushion 1100 after removal from the cushion mold and flipped right side up. The gel spring material has solidified and supportive comfort cushion 1100 can be seen comprising the plurality of gel springs 300, plurality of interlocking support structure members 910, and base cushion 1110.

Figure 12:
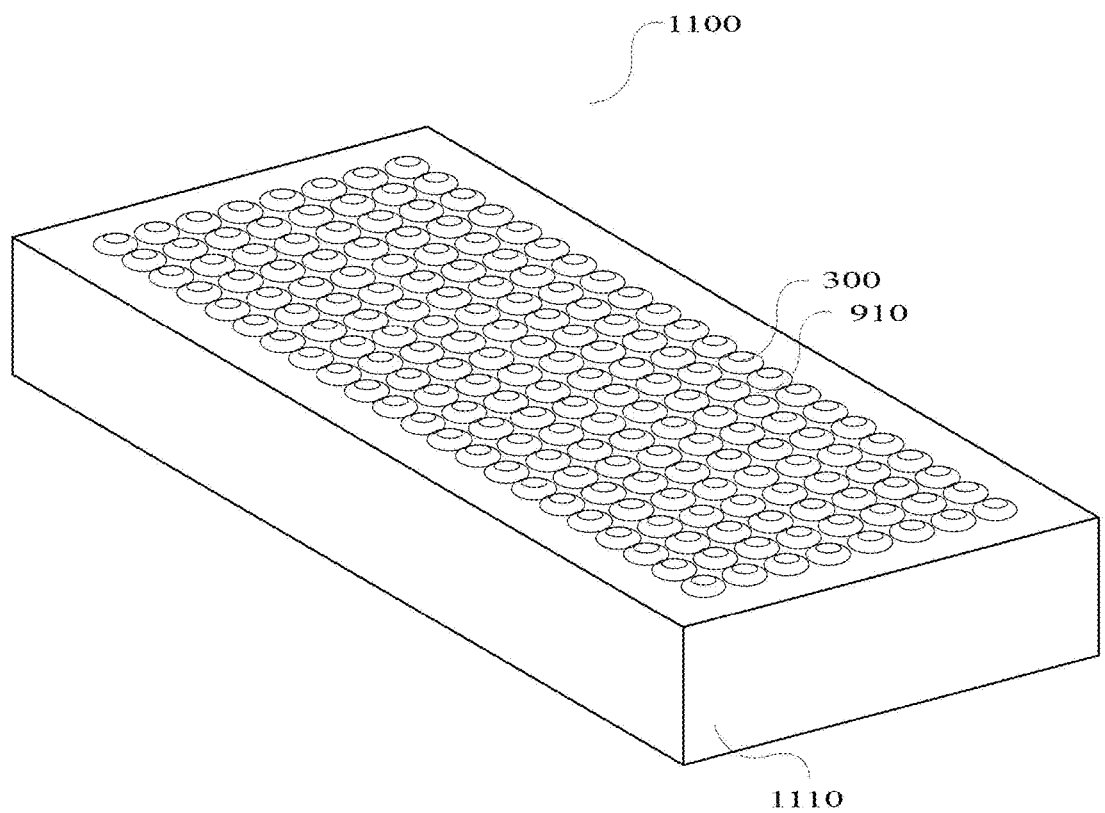
FIG. 12 is an isometric view of a gel spring cushion.

FIG. 12 shows an isometric view of the supportive comfort cushion 1100 in which the base cushion 1110 surrounds the plurality of gel springs 300 and interlocking support structure members 910 up to the level of the gel spring caps 320. The supportive comfort cushion can be covered by fabric or other suitable material for use by animals or humans. As weight or force is applied to the surface of the supportive comfort cushion 1100, each gel spring 300 has a limited surface area, yet in concert, adjacent gel springs 300 interlock through the interlocking support structure members 910, and by their mutually opposed parallel surfaces provide fractioned slippage, thus a proportionately equal distribution of weight is had, as dynamic body anatomy and weight may be applied.

In one embodiment of the present invention, the supportive comfort cushion is 18"×22" oval, contains over 4000 individual gel spring supports, each conforming in particular to body part, shape, weight, and direction of force. Pets are quite gently suspended at each turn or in any resting position. In one embodiment of the present invention, the individual gel springs are corrugated, similar to flexible drinking straws, and a solid gel pad of some thickness, of which the upper 40% of height is comprised of 4000 gel springs; not corrugated, and which pad has also perforations of some number for passage of air, or other elements.

It should be further understood that the examples and embodiments pertaining to the systems and methods disclosed herein are not meant to limit the possible implementations of the present technology. Further, although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the Claims.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A supportive comfort cushion comprising:
    a plurality of gel springs having bellows;
    a plurality of interlocking support structure members, each comprising an interlocking support structure space completely filled with gel material; and
    a base cushion;
    wherein said plurality of gel springs and said plurality of interlocking support structure members are fixedly connected to said base cushion such that:
        said plurality of interlocking support structure members completely occupy the space between, and surround and join together the plurality of gel springs; and
        the gel springs act in concert to dynamically conform to an applied body anatomy and weight, and retain vertically parallel positions when the applied weight is removed.

2. The supportive comfort cushion of claim 1, wherein said plurality of gel springs is fixedly connected to said cushion in a square tile circle packing arrangement.

3. The supportive comfort cushion of claim 1, wherein said plurality of gel springs comprises silicone gel.

4. The supportive comfort cushion of claim 1, wherein said plurality of interlocking support structure members comprises silicone gel.

5. The supportive comfort cushion of claim 1, wherein said cushion comprises silicone gel.

6. The supportive comfort cushion of claim 1, wherein said plurality of gel springs comprises a material with a lower durometer than said base cushion.

7. The supportive comfort cushion of claim 1, wherein said plurality of gel springs is fixedly connected to said cushion in a circle packing arrangement.

* * * * *